United States Patent
McCormick

(10) Patent No.: US 9,815,094 B2
(45) Date of Patent: Nov. 14, 2017

(54) WASH PAD WITH DEBRIS CONVEYOR APPARATUS

(71) Applicant: Hydro Engineering Equipment and Supply Co., LLP, Salt Lake City, UT (US)

(72) Inventor: James P. McCormick, Salt Lake City, UT (US)

(73) Assignee: Hydro Engineering Equipment and Supply Co., LLP, SLC, UT (US)

(*) Notice: Subject to any disclaimer, the term of this patent is extended or adjusted under 35 U.S.C. 154(b) by 375 days.

(21) Appl. No.: 14/072,056

(22) Filed: Nov. 5, 2013

(65) Prior Publication Data

US 2015/0122289 A1    May 7, 2015

(51) Int. Cl.
  *B08B 3/14* (2006.01)
  *B60S 3/00* (2006.01)
  *B65G 65/42* (2006.01)

(52) U.S. Cl.
  CPC  *B08B 3/14* (2013.01); *B60S 3/00* (2013.01); *B65G 65/42* (2013.01)

(58) Field of Classification Search
  CPC ........ B65G 65/42; B08B 17/025; B08B 3/14; B60S 3/00; B60S 3/040042
  USPC ..................................... 134/104.2
  See application file for complete search history.

(56) References Cited

U.S. PATENT DOCUMENTS

| | | | |
|---|---|---|---|
| 6,899,807 B2 * | 5/2005 | Cummings | B01D 29/01 210/106 |
| 7,258,749 B2 | 8/2007 | McCormick et al. | |
| 7,530,362 B2 | 5/2009 | McCormick et al. | |
| 8,499,774 B2 | 8/2013 | Petter et al. | |
| 2004/0231703 A1 * | 11/2004 | McCormick | B08B 17/00 134/10 |
| 2005/0139243 A1 * | 6/2005 | Hay | B01D 21/0006 134/104.2 |
| 2009/0250082 A1 * | 10/2009 | Miller | B08B 3/022 134/10 |
| 2011/0253175 A1 * | 10/2011 | Petter | B08B 17/025 134/18 |

* cited by examiner

*Primary Examiner* — Katelyn Whatley
(74) *Attorney, Agent, or Firm* — Jason P. Webb; Pearson Butler

(57) ABSTRACT

A wash fluid and debris containment system includes a wash pad, a collecting trough, and a conveyor. The wash pad includes a support base and a top surface that rests on the support base. The top surface is configured to direct flow of wash fluid and debris to an edge of the top surface. The collecting trough extends along the edge to receive the wash fluid and debris from the top surface. The conveyor is positioned in at least a portion of the collecting trough and operable to remove the debris from an opposite end of the collecting trough from where the wash fluid is removed.

15 Claims, 14 Drawing Sheets

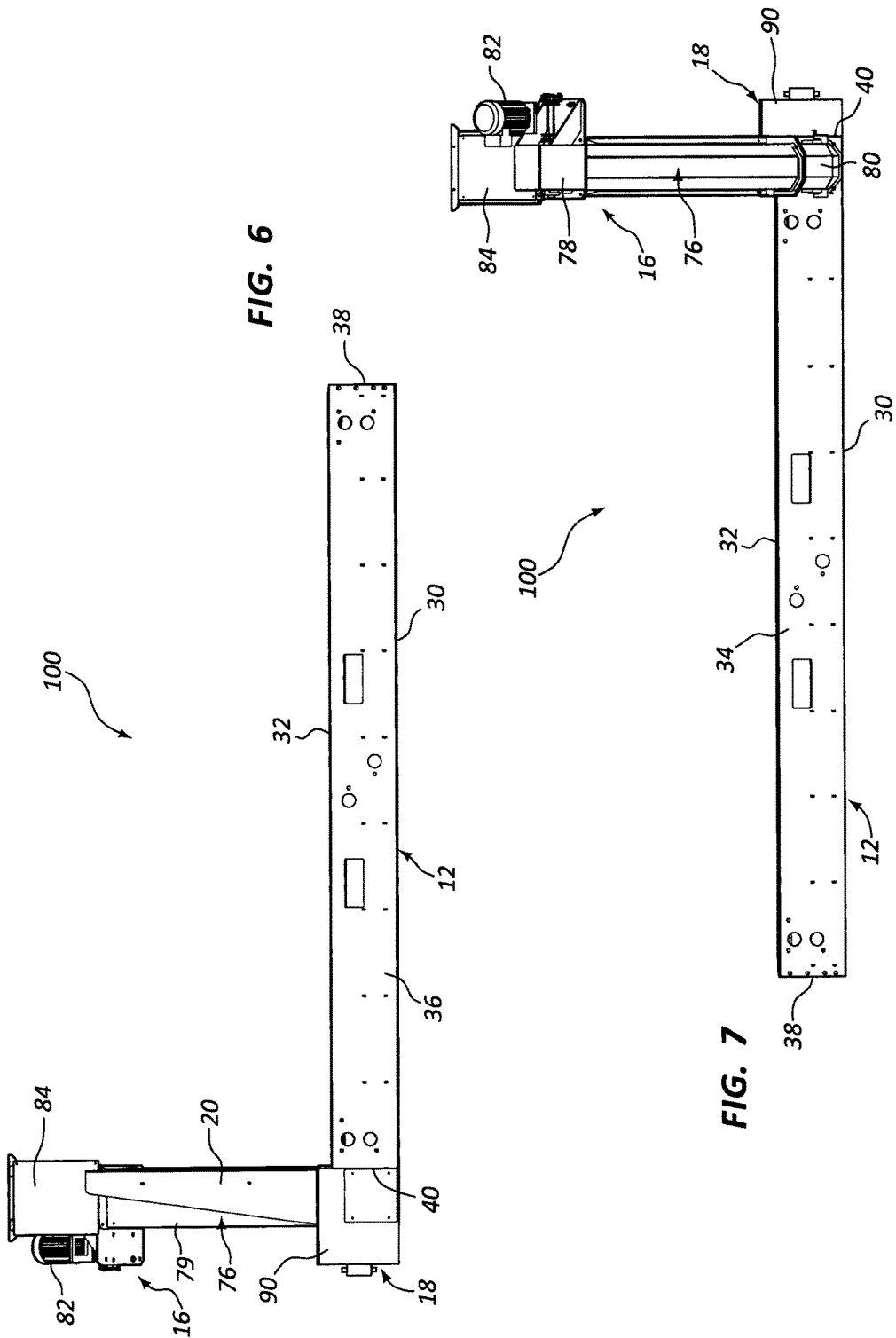

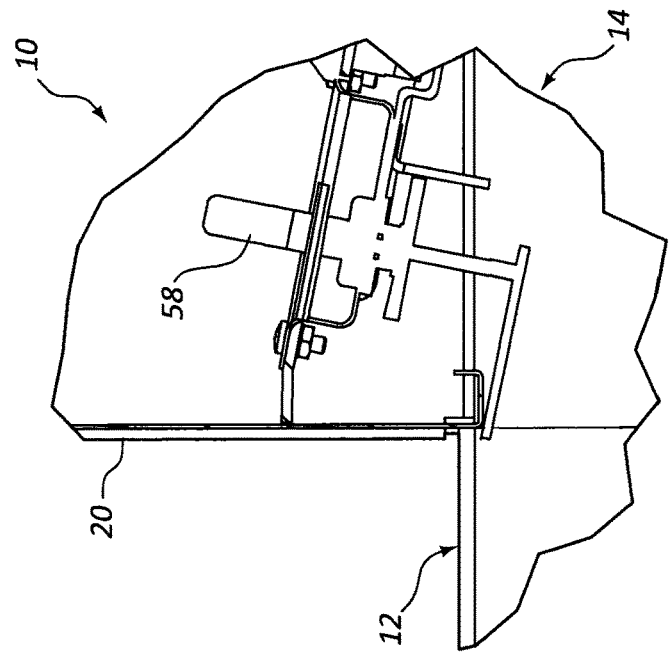
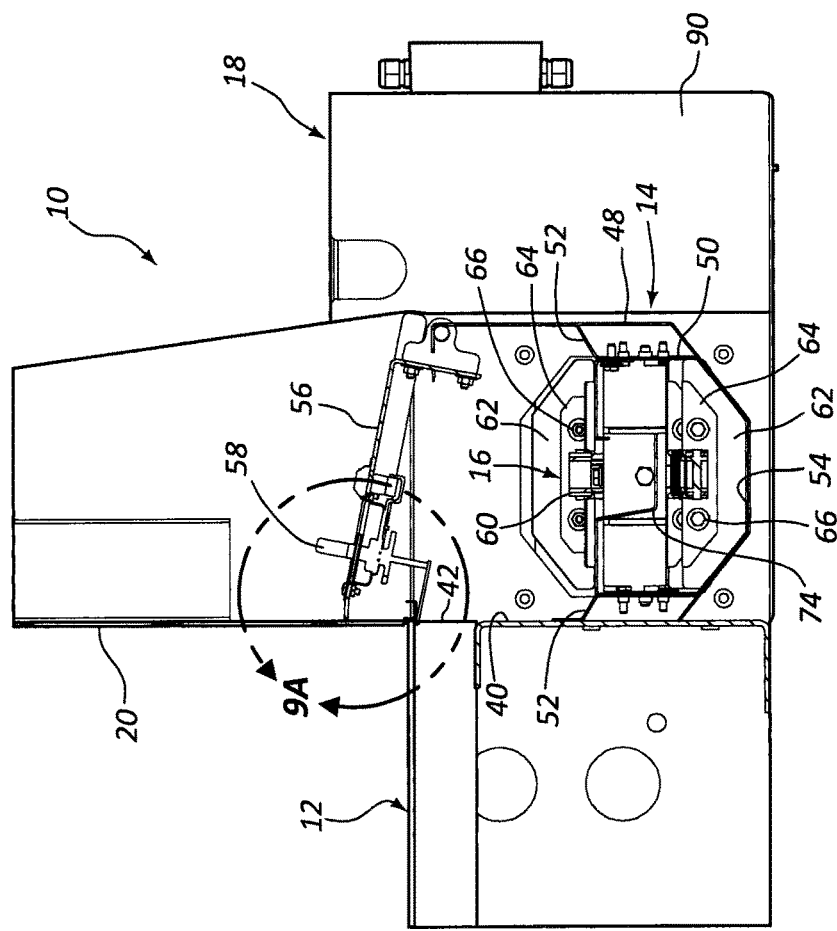

WASH PAD WITH DEBRIS CONVEYOR APPARATUS

BACKGROUND

A wash fluid containment system may be used to wash objects such as equipment, materials, vehicles, and so forth. The wash fluid containment system is used to prevent the wash fluid and any associated impurities from escaping and contaminating the surrounding environment or creating a messy work area. The wash fluid and any impurities are captured by the wash fluid containment system and treated or disposed of appropriately. The wash fluid may contain, for example, contaminants ranging from soap, detergent, and wax, which may be added to the fluid prior to washing; gasoline, oil, and grease that may be washed from the vehicle or other piece of equipment; to various other contaminants and solids that build up on the vehicle or other equipment during use.

Wash fluid containment systems may include features that assist in separating the debris (e.g., solids) from the fluids that are collected. The fluids may be treated and then either disposed of or recycled for use in cleaning other vehicles or equipment. The solids may be removed from the wash fluid containment system using any of a variety of methods. Opportunities exist for better handling and disposing of solids collected in a wash fluid containment system.

SUMMARY

A number of embodiments of improved wash fluid containment systems are described herein. In one embodiment, a wash fluid and debris containment system includes a wash pad, a collecting trough, and a conveyor. The wash pad includes a support base and a top surface that rests on the support base. The top surface is configured to direct flow of wash fluid and debris to an edge of the top surface. The collecting trough extends along the edge to receive the wash fluid and debris from the top surface. The conveyor is positioned in at least a portion of the collecting trough and operable to remove the debris from an opposite end of the collecting trough from where the wash fluid is removed.

The system may further include a lockable lid arranged to cover the collecting trough. The system may include a separator positioned between the top surface and the collecting trough, wherein the separator prevents debris above a threshold size from entering into the collecting trough. The collecting trough may extend along a side of the wash pad. The system may further include a screen positioned between the conveyor and a fluid outlet of the collecting trough, wherein the conveyor scrapes debris from the screen as the conveyor moves past the screen. The wash fluid may flow through the screen into a fluid collector.

Another aspect of the present disclosure relates to a wash fluid and debris containment system that includes a wash pad, a collecting trough, a fluid collector, and a screen. The collecting trough is configured to receive wash fluid and debris collected on the wash pad. The conveyor includes at least one chain and a plurality of flights connected to the at least one chain, wherein the plurality of flights are movable by the at least one chain to remove the debris from the collecting trough. The fluid collector is arranged in flow communication with the collecting trough. The screen is interposed between the collecting trough and the fluid collector. The plurality of flights remove debris from the screen as the conveyor moves past the screen.

The wash fluid may flows over the screen and out of the collecting trough when the screen is clogged with debris. The conveyor may be configured to discharge the debris at a position elevated above the wash pad. The plurality of flights may extend downward from the at least one chain when positioned to move the debris out of the collecting trough. The collecting trough may include a replaceable gutter insert having a profile that matches a profile of the plurality of flights. The wash fluid may flow over the plurality of flights when moving toward the screen the plurality of flights providing a weir function in the collecting trough. The system may include a shield positioned in the collecting trough and extending over the at least one chain to protect the at least one chain from contact by the debris.

A further aspect of the present disclosure relates to a wash fluid and debris conveyor system that includes a collecting trough, a debris conveyor, and a fluid collector. The debris conveyor is movable along at least a portion of the collecting trough to remove debris from the collecting trough in a first direction. The fluid collector is arranged in flow communication with the collecting trough. Wash fluid in the collecting trough flows into the fluid collector in a second direction that is opposite the first direction.

The fluid collector may include a screen that blocks debris from flowing from the collecting trough into the fluid collector. The debris conveyor scrapes debris from the screen as the debris conveyor moves past the fluid collector. The system may further include at least one of a liquid jet and a compressed air stream which are configured to clean off the screen.

Another aspect of the present disclosure relates to a method of handling wash fluid and debris. The method includes providing a wash pad, a collecting trough, a conveyor, a fluid collector, and a screen, washing debris from an object positioned on the wash pad, collecting wash fluid and the debris in the collecting trough, removing the debris from the collecting trough with the conveyor, and passing the wash fluid through the screen and into the fluid collector. The conveyor removes debris from the screen as the conveyor removes the debris from the collecting trough.

The method may also include removing the debris from the collecting trough in a first direction and removing the wash fluid from the collecting trough in a second direction opposite the first direction. The conveyor may include a at least one chain and a plurality of flights mounted to the at least one chain, wherein removing the debris includes moving the plurality of flights along a bottom surface of the collecting trough. The plurality of flights may scrape debris from the screen as the conveyor moves past the screen.

The foregoing and other features, utilities, and advantages of the subject matter described herein will be apparent from the following more particular description of certain embodiments as illustrated in the accompanying drawings.

BRIEF DESCRIPTION OF THE DRAWINGS

FIG. 6 is a left side view of the wash fluid containment system of FIG. 1.

FIG. 7 is a right side view of the wash fluid containment system of FIG. 1.

FIG. 9 is a cross-sectional view of a portion of the wash fluid containment system of FIG. 3 taken along cross-section indicators 9-9.

FIG. 9A is a close up view of a lock feature of the wash fluid containment system shown in FIG. 9.

DETAILED DESCRIPTION

Figure 1:
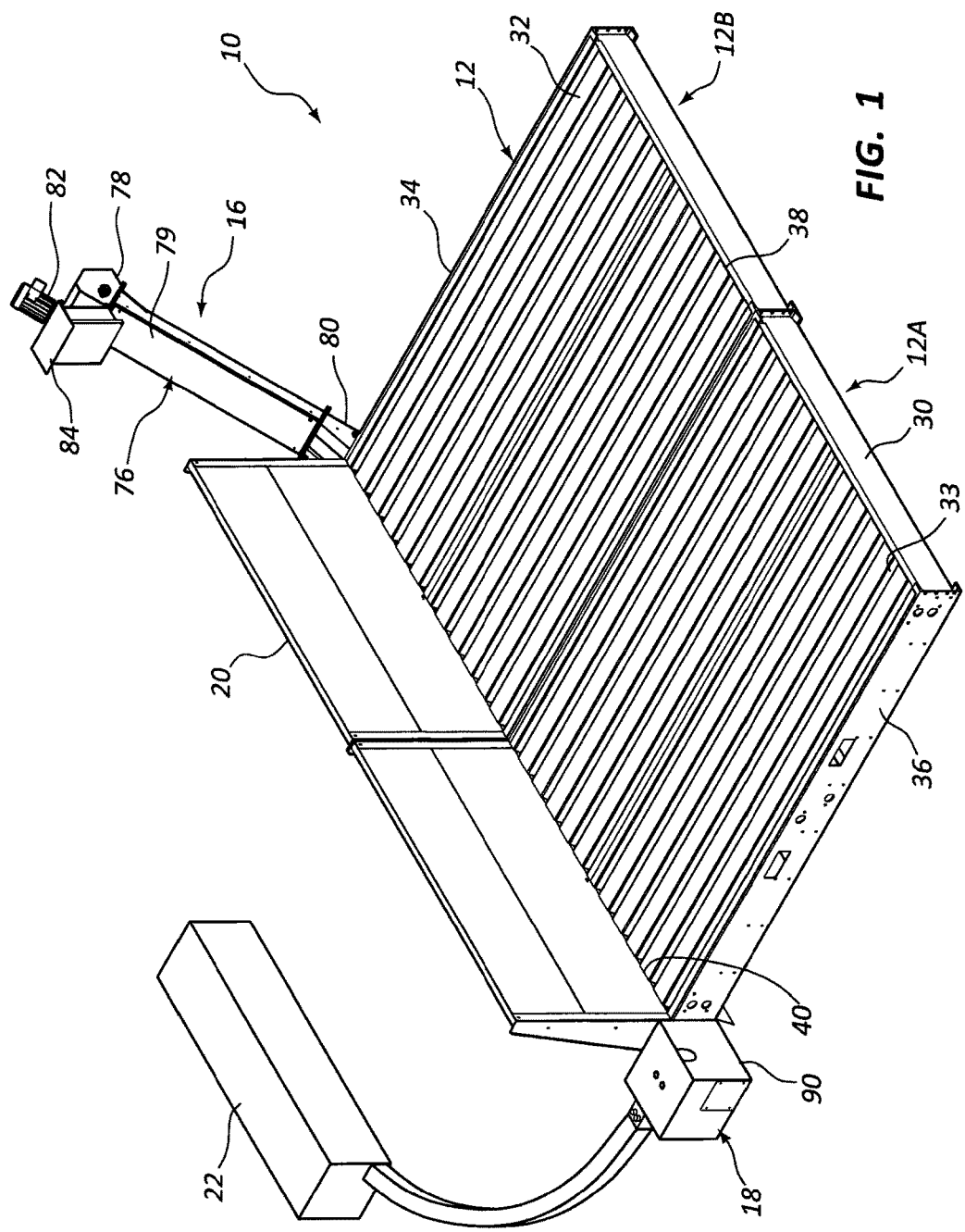
FIG. 1 is a perspective view of an example wash fluid containment system in accordance to the present disclosure.

A variety of embodiments of wash fluid containment systems are described herein. In general, a wash fluid containment system is a system that is used to wash an object and prevent the wash fluid and any associated contaminants from escaping into the environment or the surrounding work area. A wash fluid containment system may be used to wash any object that has become dirty or soiled. For example, the wash fluid containment system may be used to wash equipment such as heavy machinery, implements, vehicles, and so forth.

The various embodiments of the wash fluid containment system described herein may be similar in many respects to the wash fluid containment systems described in U.S. Pat. No. 7,258,749, entitled "Wash Fluid Containment System," issued on 21 Aug. 2007 and U.S. Pat. No. 7,530,362, entitled "Low Profile Non-Clogging Non-Polluting Surface Treating Pads, Assemblies and Methods," issued on 12 May 2009, each of which is incorporated herein in its entirety by this reference. In the event of a conflict, the subject matter explicitly recited or shown herein controls over any subject matter incorporated by reference. It should be appreciated that many of the elements and components of the wash fluid containment systems described herein may be similar or identical to the elements and components of the wash fluid containment systems described in the referenced patent documents. Accordingly, many of the components, elements, configurations, features, advantages, characteristics, etc, of the embodiments of the wash fluid containment systems described in the patent documents may be incorporated into the wash fluid containment systems described herein. Also, the nomenclature used in the referenced patent documents to describe a similar component or element may also be used to describe such a component or element herein.

Traditionally, debris and solids collected during use of a wash fluid containment system (generally referred to as "debris") are separated out from the wash fluids and then disposed of using a manual removal process. For example, the solids may collect with the wash fluids in a side bin, settling tank or the like associated with the wash fluid containment system where the wash fluids are drawn off and the debris is removed using, for example, a skid steer loader, shovels, or other manual process. One aspect of the present disclosure relates to systems and methods for separating wash fluids from the debris collected on the wash pad, and automatically moving the debris away from the wash fluid containment system.

The wash fluid containment system may include a conveyor assembly that transports the debris away from the wash pad. The conveyor assembly may elevate the debris to a height that facilitates easier loading of the debris into a debris container. The debris may be conveyed or removed in a direction that is opposite the direction in which the wash fluids are removed. For example, the debris and wash fluids that collect on a top surface of the wash pad may drain to a collecting trough along at least one side edge of the wash pad. The conveyor assembly may move the debris toward one end of the collecting trough, up an elevated chute, and into a debris container. The wash fluids may be removed in an opposite direction at an opposite end of the collecting trough.

A fluid collection assembly may be used to remove wash fluids from the collecting trough. The fluid collecting assembly may include a screen positioned in the collecting trough (e.g., at an end of the collecting trough adjacent to an outlet opening in the collecting trough). The conveyor assembly may include a plurality of flights or paddles that move along a bottom surface of the collecting trough to advance the debris in a direction away from the screen. The flights may contact (e.g., scrape) the screen as they move through their rotation path, thereby cleaning off debris from the screen to enhance fluid flow through the screen.

The flights moving along the collecting trough may act as weirs that help separate the debris from the wash fluid. Typically, the wash fluids flow over the top of the flights as the wash fluid move along the collecting trough to the fluid outlet while the debris is captured by the flights and pushed in an opposite direction to a debris outlet of the collecting trough. Consequently, the wash fluids that reach the end of the collecting trough carry less debris and thereby more easily flow through the screen and out of the collecting trough. The fluid collection assembly may include other features to help keep the screen free of debris. For example, a water jet, vacuum force, or compressed air stream may be used to clean the screen periodically.

The flights may be moved through the collecting trough using at least one chain to which the flights are collected. A shield member may be positioned in the collecting trough to cover portions of the chain to prevent debris from riding on the chain as the chain travels along the bottom of the trough towards a debris discharge end of the conveyor assembly. The shield may help limit the chance of debris becoming lodged between the chain and the sprockets about which the chain rotates and is driven. Other details concerning example wash fluid containment systems in accordance with the present disclosure are described hereinafter with reference to FIGS. 1-16.

Turning now to the figures, one embodiment of a wash fluid containment system 10 is shown in FIGS. 1-13. First referring to FIGS. 1 and/or 2, the wash fluid containment system 10 includes a wash pad 12, a collecting trough 14 (see FIG. 2), a conveyor assembly 16, a fluid collection assembly 18, a containment wall 20, and a cleaning system 22. The collecting trough 14 may be positioned along one side of the wash pad 12. In other embodiments, the collecting trough 14 may be positioned at other locations such as between adjacent wash pads 12A, 12B or through a middle portion of a wash pad. The conveyor assembly 16 may be mounted to and cooperate with the collecting trough 14 to remove debris collected in the collecting trough. The fluid collection assembly 18 may be used to remove wash fluids from the collecting trough 14. The collected wash fluids may be directed to the cleaning system 22 where the wash fluids are treated. The treated wash fluids may be supplied to an operator cleaning vehicles or equipment on the wash pad 12. The containment wall 20 may be used to block large debris from moving into the collecting trough 14, wherein the large debris might otherwise create jamming or other problems associated with operation of the conveyor assembly 16. Containment wall 20 may also help retain the wash fluids and debris on top of the wash pad 12. The wash fluid containment system 10 may include additional container walls 20 positioned along other sides of the wash pad 12 to assist with retaining the wash fluids and debris on top of the wash pad 12.

Wash pad 12 includes a support base 30 and a top surface 32 positioned on the support base 30. The top surface 32 may include grooves or channels 33 that direct the wash fluids and debris to the collecting trough 14. Wash pad 12 also includes first and second sides 34, 36, front and rear sides 38, 40, and an edge 42 positioned between the collecting trough 14 and the top surface 32 (see FIG. 9). The containment wall 20 may be positioned along the edge 42 (see FIG. 9).

Figure 2:
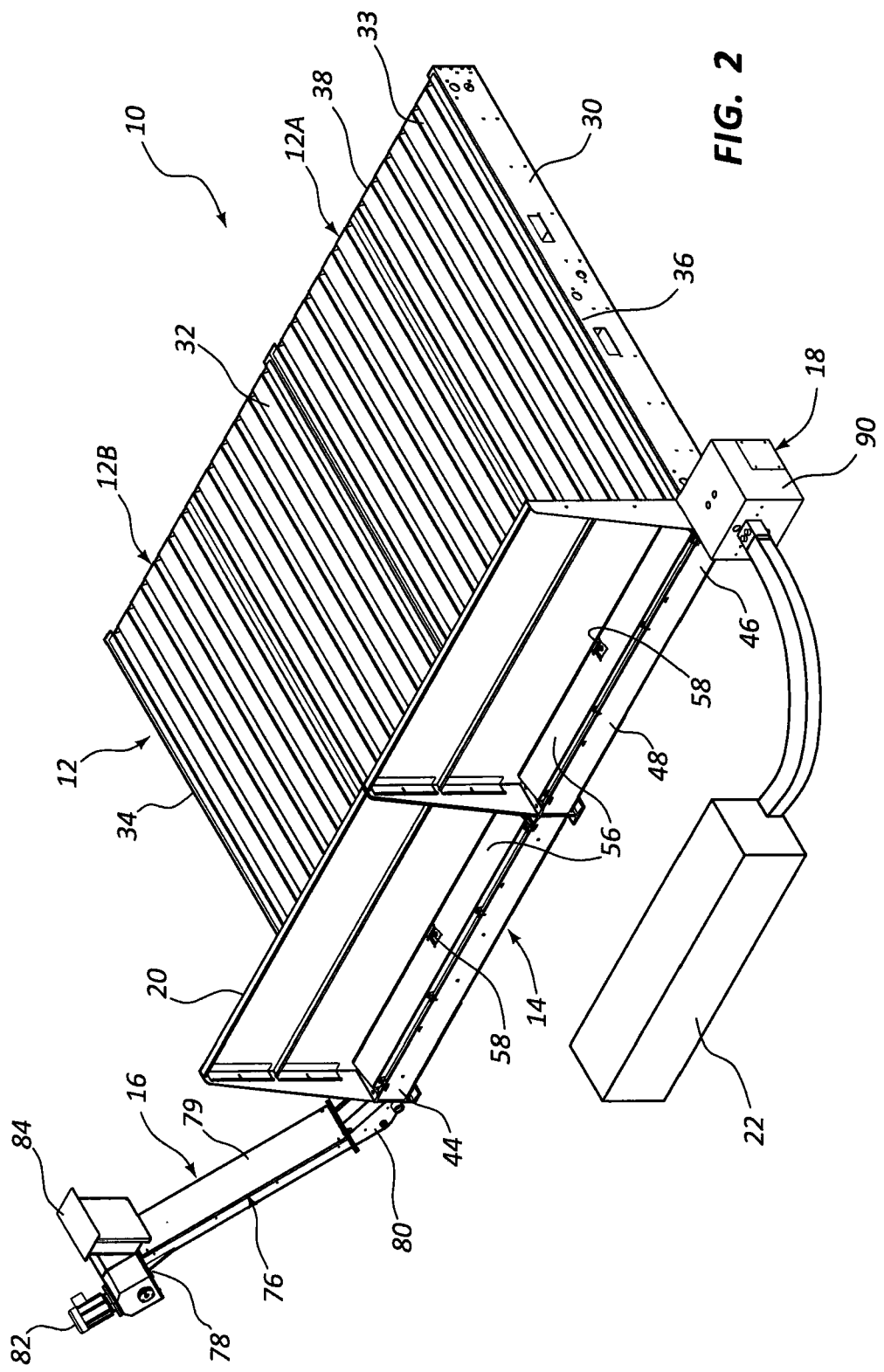
FIG. 2 is another perspective view of the wash fluid containment system of FIG. 1.
Figure 3:
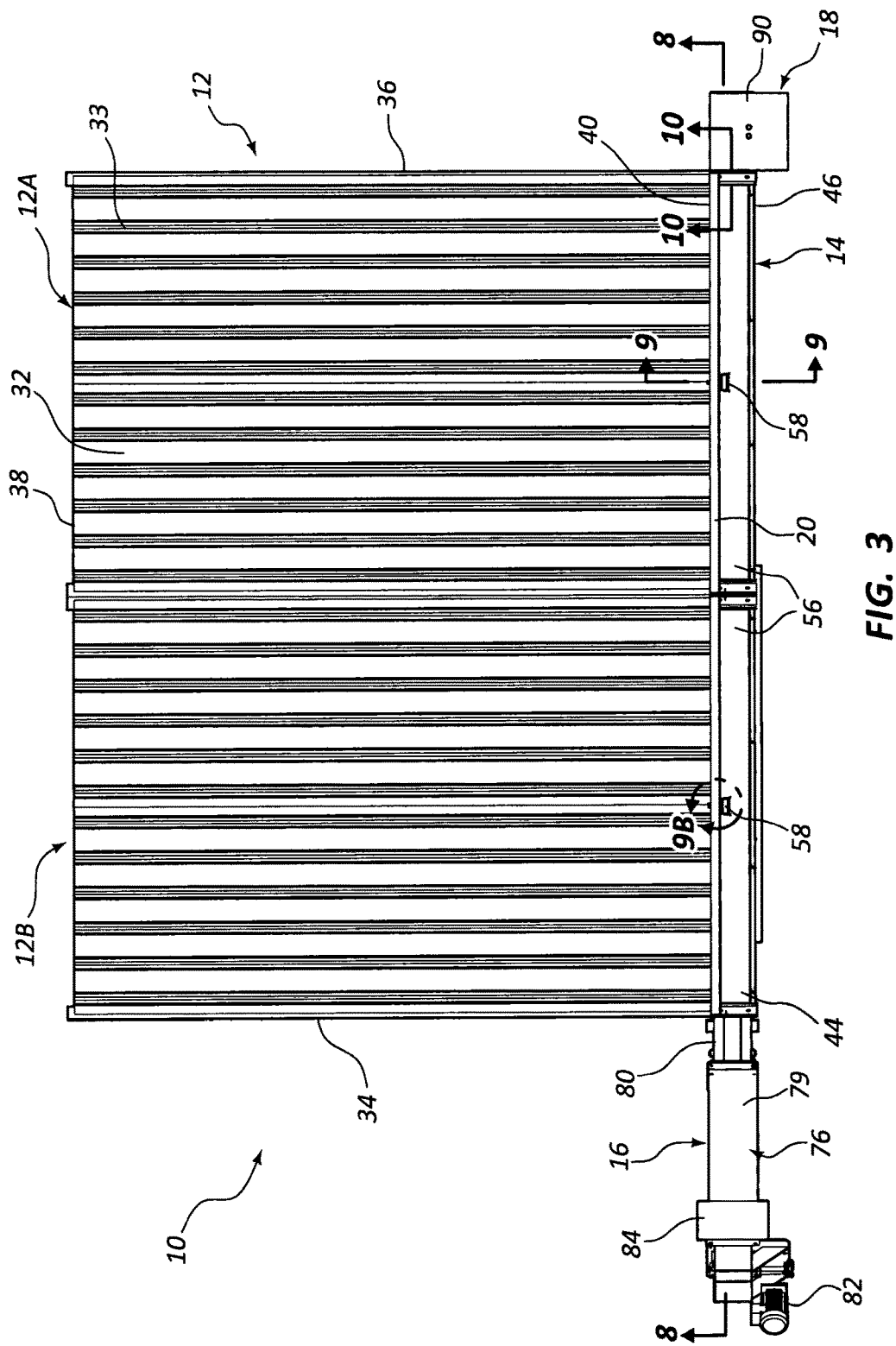
FIG. 3 is a top view of the wash fluid containment system of FIG. 1.
Figure 4:
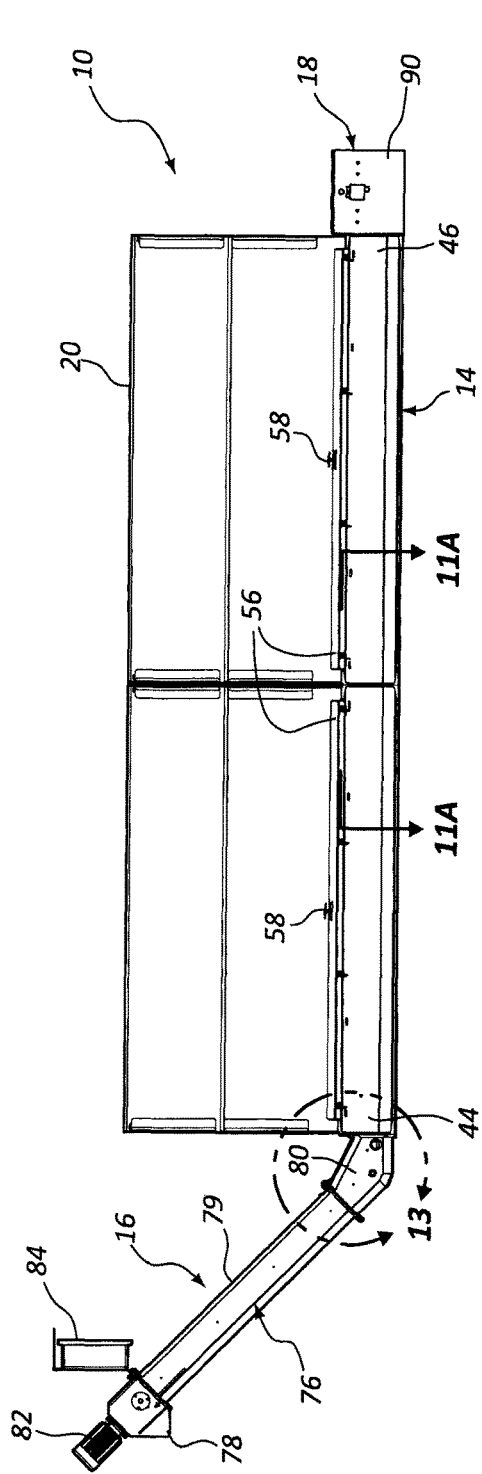
FIG. 4 is a rear view of the wash fluid containment system of FIG. 1.
Figure 5:
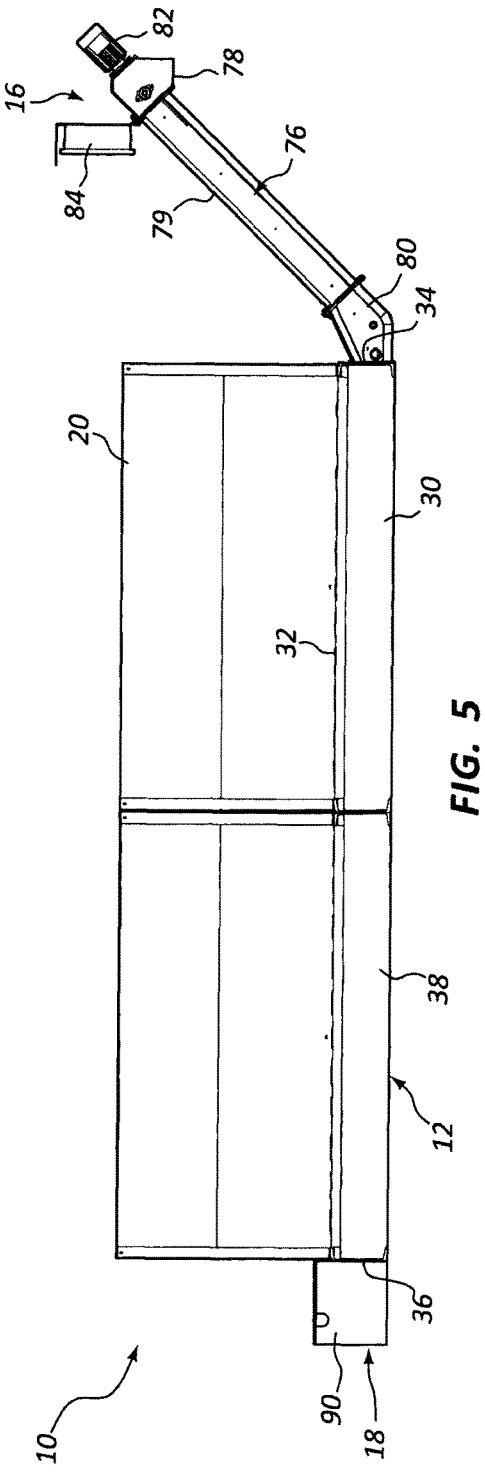
FIG. 5 is a front view of the wash fluid containment system of FIG. 1.
Figure 8:
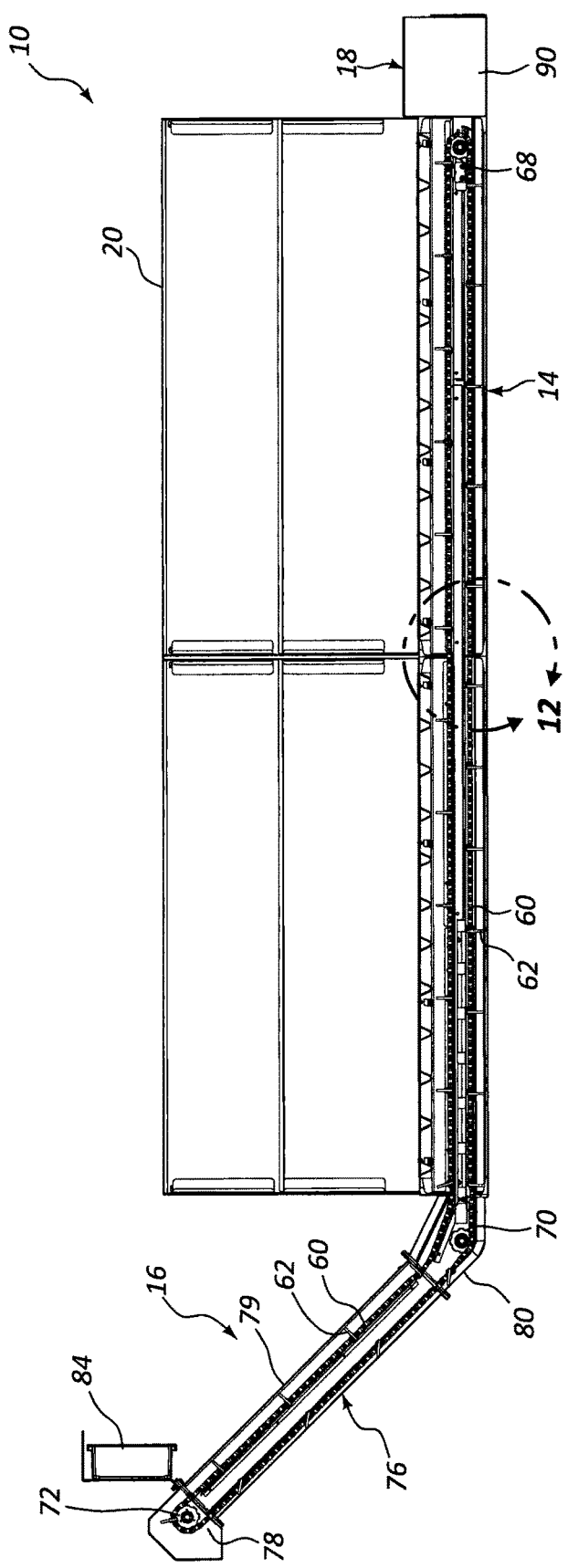
FIG. 8 is a cross-sectional view of the wash fluid containment system of FIG. 3 taken along cross-section indicators 8-8.
Figure 9B:
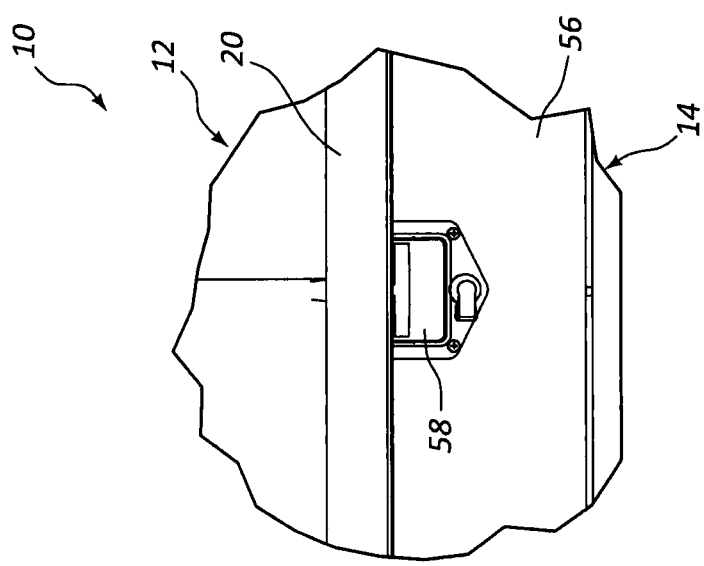
FIG. 9B is a close up view of the lock feature shown in FIG. 3.

Wash pad 12 may include a plurality of separate wash pads 12A, 12B that are connected together as shown in FIGS. 1 and 2. Other arrangements may include 3 or more wash pads, while still further arrangements may include only a single wash pad. As mentioned above, other embodiments may include a collecting trough positioned between adjacent wash pads. Referring to FIG. 2, the collecting trough 14 includes first and second ends 44, 46, lids 56, and locks 58 for the lids 56. FIG. 9 shows the collecting trough 14 further including an outer wall 48, a plurality of trough inserts 50 (see FIG. 16), and a trough bottom surface 54. The outer wall 48 may include a bottom portion having a shape that substantially matches the shape of the bottom portion of the trough inserts 50. FIG. 9 shows the mating arrangement of the trough inserts 50 within the outer wall 48. The trough inserts 50 include trough guides 52 that secure the trough inserts 50 to outer wall 48. A portion of the conveyor assembly may have a shape that substantially matches the shape or profile of a bottom portion of the trough inserts 50, which may assist in moving the debris positioned in the collecting trough 14 along the length of the collecting trough 14 and away from the wash pad 12. The trough inserts 50 may be referred to as gutters and may be replaceable. The trough inserts 50 may form a continuous, longitudinal profile inside of the collecting trough 14. The trough inserts 50 may extend the service life of the collecting trough 14 and may provide a smooth transition from the conveyor chain and flights (described below) as they move from one wash pad section to the next.

The lids 56 may be moveable between open and closed positions to provide access into the conveyor assembly 16 and the trough inserts 50. The lids 56 may be secured in a closed position with locks 58. FIGS. 9 and 9A show an example lock 58 which may operate between locked and unlocked positions. Other types of locks, latches and other access control features may be used with lids 56. The lids 56 may be hinged and lockable to provide easy access for service while providing protection against unauthorized user from accessing the components within the collecting trough 14. Alternatively, lids 56 may be completely removed such that the conveyor assembly 16 is exposed and accessible at all times.

In other arrangements, the trough inserts 50 with associated trough guides 52 may be integrated into a single trough structure, wherein the trough structure matches the profile or shape of the portions of the conveyor assembly 16 used to move the debris along the length of the collecting trough 14. The use of a separate trough insert 50 may have advantages related to creating a water-tight seal on the length of the collecting trough 14, spanning a connection point between adjacent wash pads to help reduce leakage of wash fluids, and custom forming or shaping of an interface between features of the conveyor assembly 16 and the collecting trough 14.

The lids 56 may be arranged relative to the top surface 32 of the wash pad 12 to assist in blocking large debris from moving into the collecting trough 14, particularly when containment wall 20 is not present. For example, lids 56 may be arranged at an angle relative to a horizontal plane and include a lip or protrusion along an edge thereof positioned adjacent to edge 42 of wash pad 12 to block large sized debris. Smaller sized debris may travel along the grooves 33 formed in top surface 32 of wash pad 12. When container walls 20 are in place as shown in FIG. 9, a free edge of lids 56 rests against a vertical portion of container walls 20 and lock 58 engages against a bottom edge of container walls 20. When container walls 20 are removed, the free edge of lids 56 rests against the top surface 32 of wash pad 12 along side edge 42, and lock 58 engages against a bottom surface of wash pad 12 adjacent to side edge 42.

Referring now to FIGS. 8-13, various aspects of the conveyor assembly 16 are shown and described. Conveyor assembly 16 includes a chain 60 to which a plurality of flights 62 are mounted with flight brackets 64 and flight fasteners 66 (see FIGS. 9 and 11A). Conveyor assembly 16 also includes first, second and third sprocket 68, 70, 72 about which the chain 60 is wound. At least one of the sprockets 68, 70, 72 drives the chain (see FIG. 8). Conveyor assembly 16 may also include a shield 74 (see FIGS. 9, 11A, 11B, 12 and 16) that at least partially blocks or covers the portion of chain 60 positioned in the bottom of collecting trough 14. Shield 74 may limit larger debris such as rocks from riding along the top surface of the lower portion of chain 60 and getting caught in the sprockets 68, 70, 72 and jamming chain 60. Shield 74 may be mounted to the trough inserts 50 as shown in at least FIG. 9.

Conveyor assembly 16 may also include a chute 76 that is in flow communication with the collecting trough 14. Chute 76 may include an open end 78, an access cover 79, an elbow section 80 (see FIG. 8), and an internal bottom surface 81 (see FIG. 13). The access cover 79 may be lockable or require tools to open in order to provide some control of access to the components held internally within chute 76. Chute 76 directs the debris being moved by chain 60 and flights 62 vertically upward to the open end 78 where the debris may be dispensed into a collection device such as a debris container 28 (see FIG. 14). In other arrangements, chute 76 may extend directly horizontally from collecting trough 14 rather than in a vertical direction and may deposit debris into a below ground container or pit. In still further embodiments, no chute 76 is used and the debris is moved from collecting rough 14 directly into a below ground debris collection container or pit positioned adjacent to or below wash pad 12.

The chain 60 may be driven by a motor 82. The motor 82 may be positioned at open free end 78 of chute 76 and be operable to rotate third sprocket 72, which drives chain 60. Conveyor assembly 16 may also include a control box 84 that contains a controller and a user interface for controlling operation of motor 82. Control box 84 may include capabilities for monitoring the load on motor 82 and may adjust power delivered to motor 82 according to the load. In at least some examples, control box 84 turns off motor 82 automatically in certain circumstances, such as when no wash fluid and/or debris is flowing into collecting trough 14, or when no vehicles or equipment are positioned on wash pad 12.

Figure 11A:
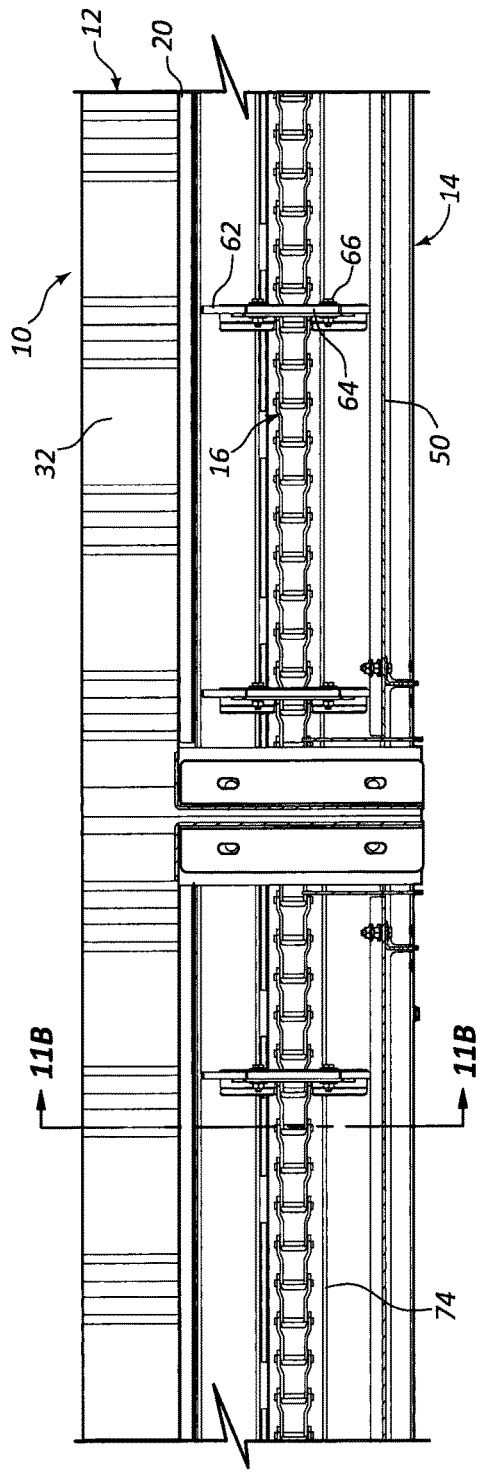
FIG. 11A is a cross-sectional view of a portion of the wash fluid containment system shown in FIG. 4 taken along cross-section indicators 11A-11A.
Figure 11B:
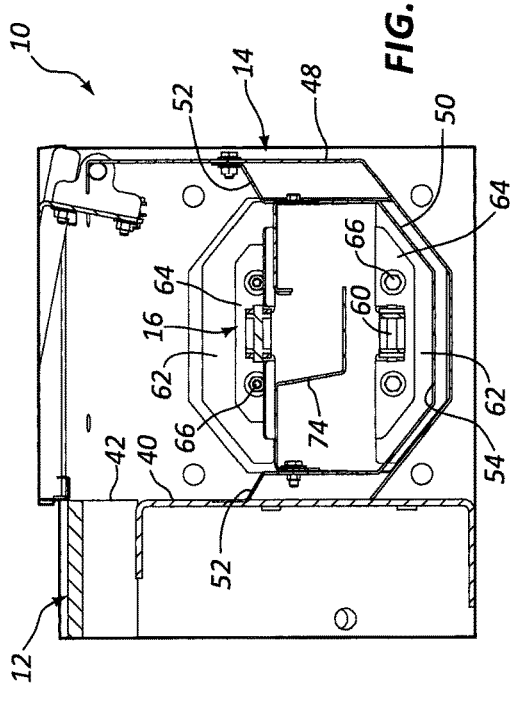
FIG. 11B is a cross-sectional view of the wash fluid containment system shown in FIG. 11A taken along cross-section indicators 11B-11B.
Figure 12:
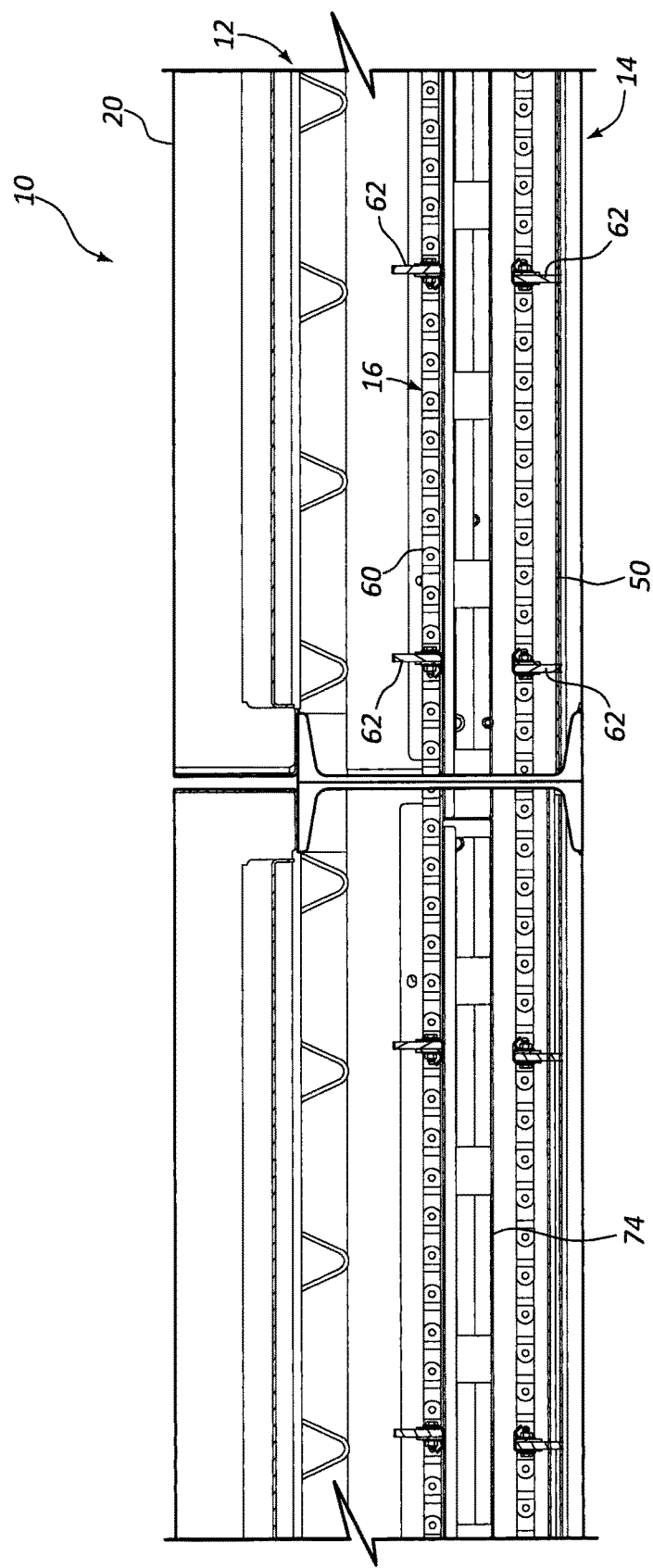
FIG. 12 is a close up view of a portion of the wash fluid containment system shown in FIG. 8.
Figure 13:
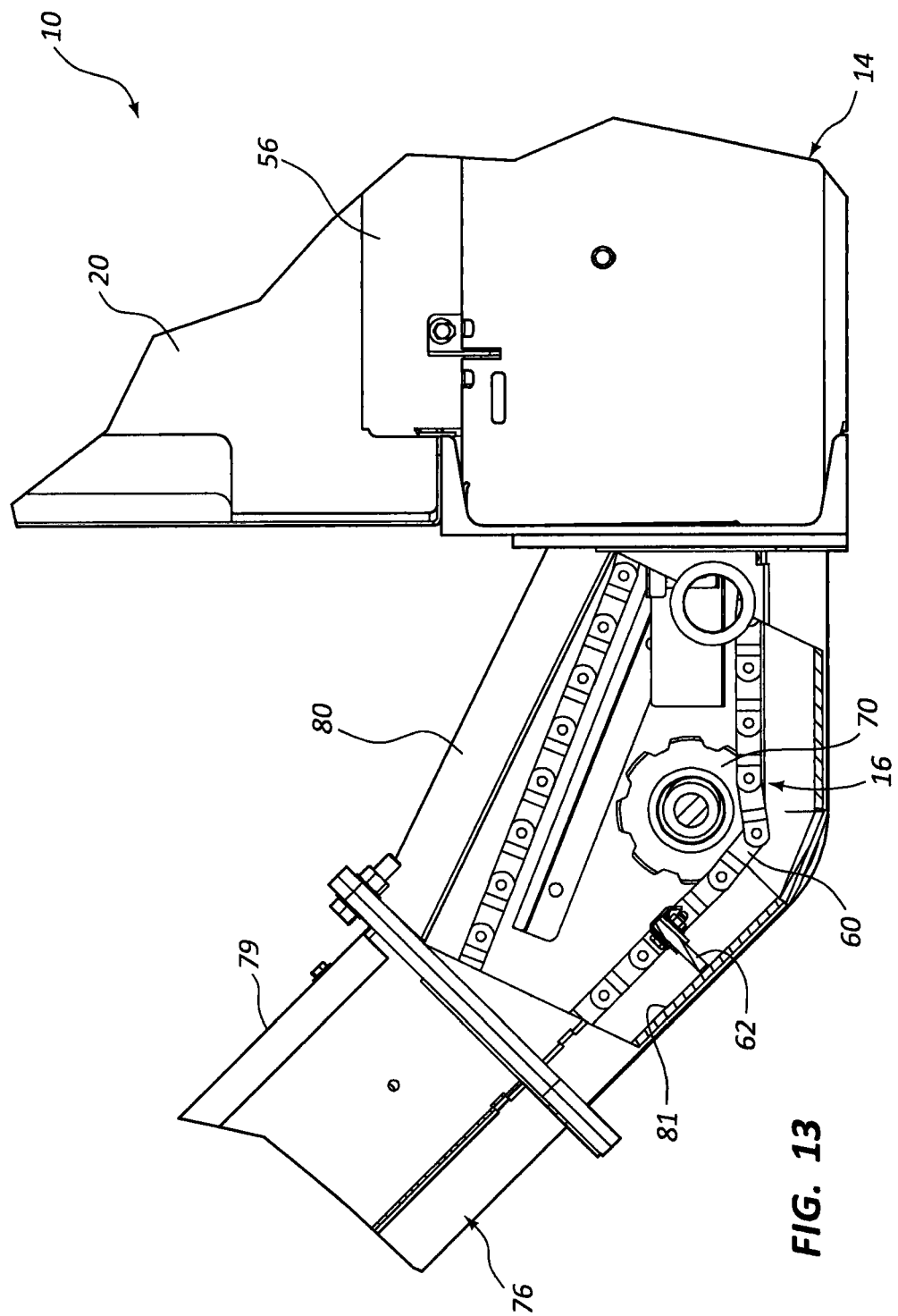
FIG. 13 is a close up view of a portion of the wash fluid containment system shown in FIG. 4 with a portion thereof cut away.

FIGS. 9 and 11B show cross-sectional views of collecting trough 14 and a portion of conveyor assembly 16. The flights 62 are shown having a profile that substantially matches the profile of trough insert 50. As such, the flights 62 are able to effectively push (or pull) debris along the bottom of trough insert 50 toward the chute 76 and out through the open end 78 of chute 76. The bottom surface 81 of chute 76 may have a profile that also substantially matches the profile of flights 62 and the shape of bottom surface 54 of trough insert 50.

The flights 62 may comprise a flexible, resilient material such as, for example, rubber, nylon or other polymeric material. The material of flights 62 may provide a close, low friction interface between flights 62 and the trough insert 50 and chute 76. Alternatively, flights 62 may comprise a rigid material such as a metal or metal alloy.

Figure 10:
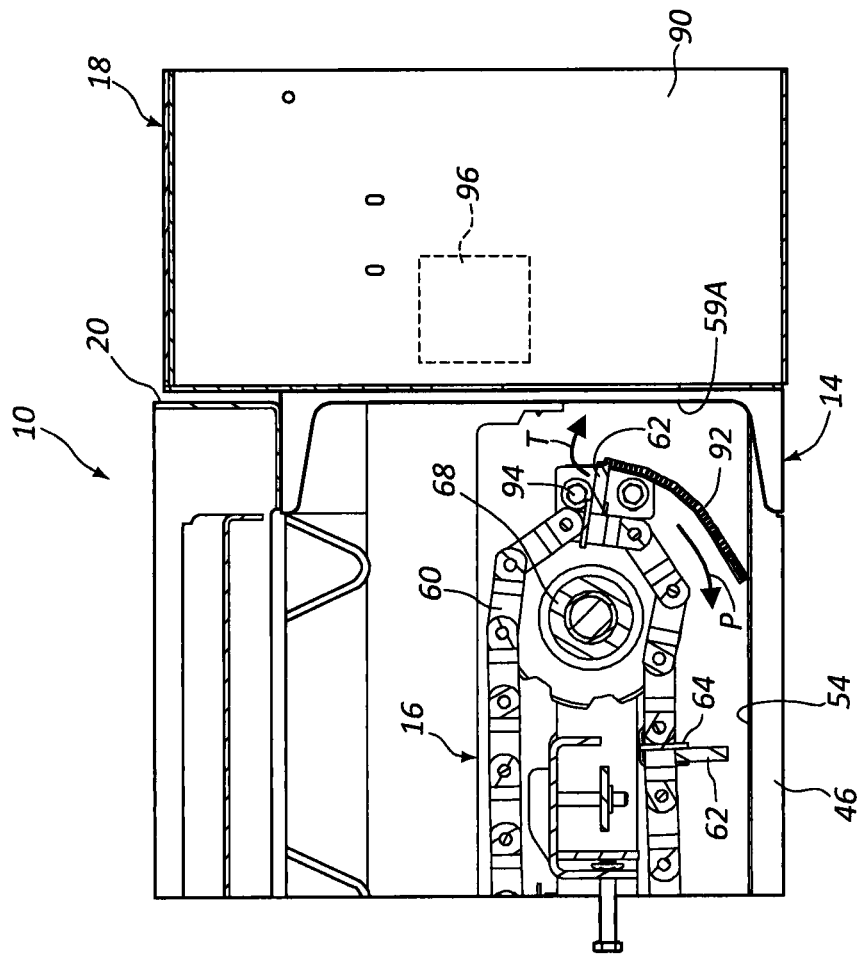
FIG. 10 is a cross-sectional view of a portion of the wash fluid containment system shown in FIG. 3 taken along cross-section indicators 10-10.

The fluid collection assembly 18 is shown in part in at least FIGS. 1 and 10. Fluid collection assembly 18 includes a container 90, a screen 92, a screen positioner 94, and a screen cleaner (see FIG. 10). Container 90 is positioned in flow communication with collecting trough 14 via a first outlet opening 59A (see FIGS. 10 and 15). Screen 92 extends from bottom surface 54 of trough insert 50 in a generally vertical direction and is interposed between the first outlet opening 59A and the conveyor assembly 16. In some arrangements, screen 92 is spaced away from first outlet opening 59A. In other examples, screen 92 is mounted directly covering or overlapping first outlet opening 59A.

Screen 92 may have a generally contoured shape as shown in FIG. 10. The screen 92 may be shaped to substantially match a path P through which the flights 62 travel while rotating around first sprocket 68. The flights 62 may contact and move along a surface of screen 92 as the chain 60 rotates about first sprocket 68. The flights 62 may remove debris from screen 92 to increase fluid flow through screen 92. In the event screen 92 is clogged either because the flights 62 do not properly contact the screen 92 or the screen 92 becomes clogged in between when flights 62 scrape off the screen 92, the fluids in collecting trough 14 may move over the top of screen 92 in the direction T, as shown in FIG. 10. Screen 92 (when clogged) may act as a weir structure that holds debris within collecting trough 14 while the wash fluids move over the top of screen 92. Accordingly, the position and arrangement of screen 92 within collecting trough 14 permits continued operation of wash fluid removal from collecting trough 14 even if screen 92 becomes clogged.

As mentioned above, the screen 92 is typically located at the edge of the arc that the flights 62 make as they travel around the first sprocket 68 at the end of the conveyor assembly 16. Because the conveyor assembly 16 has a length may be less than the overall length of the collecting trough 14, the screen 92 may be designed to be positioned inside and adjustable relative to the collecting trough 14. In other examples, the screen 92 may be mounted to an outer surface of or positioned on a side wall of the collecting trough 14. The screen 92 does not necessarily need to be arranged for contact by flights 62 if other methods are used to clean off screen 92 when clogged.

Fluid collection assembly 18 may further include a screen cleaner 96 (shown generically in FIG. 10). Screen cleaner 96 may provide additional cleaning of screen 92 using any of a number of different cleaning methods. For example, screen cleaner 96 may provide a liquid jet, a compressed air stream, or a vacuum force that removes debris from screen 92. Screen cleaner 96 may be positioned adjacent to or within container 90, or may be positioned at least partially within collecting trough 14.

The screen positioner 94 may alter a position and/or shape of screen 92 relative to the flights 62. First sprocket 68 may be adjusted longitudinally to adjust tension in chain 60, which may influence a spatial relationship between the flights 62 and screen 92. Screen positioner 94 may be adjusted to account for any changes in the position of chain 60 and flights 62. Screen positioner 94 may include a self-adjusting feature such as a spring-loaded tensioner that helps maintain contact between flights 62 and screen 92 through the rotation path P.

Figure 14:
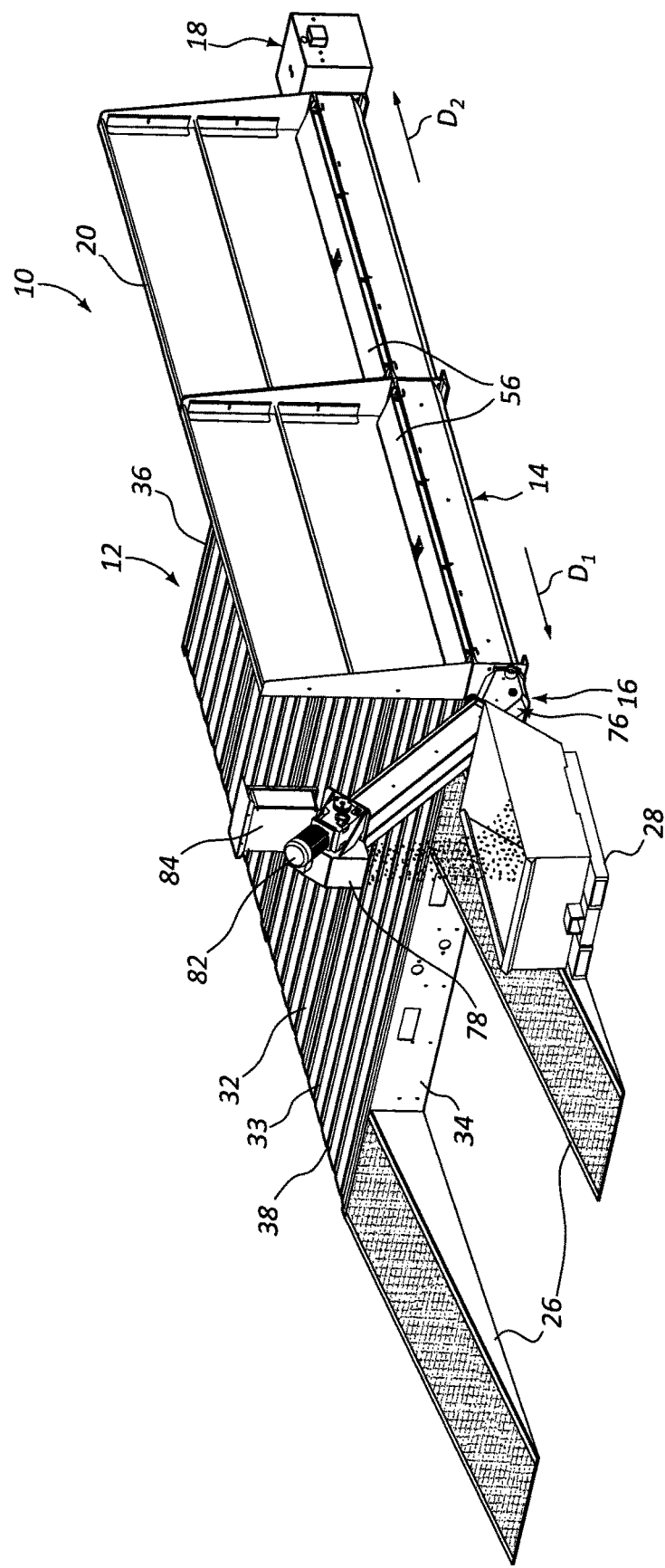
FIG. 14 is a perspective view of the wash fluid containment system shown in FIG. 1 additionally including a pair of ramps and a debris container.

Referring now to FIG. 14, the wash fluid containment system 10 is shown in operation removing debris from collecting trough 14 and into a debris container 28. Conveyor assembly 16 moves the debris in a first direction $D_1$, through the chute 76 and into the debris container 28. Wash fluids are moved along the collecting trough 14 in an opposite, second direction $D_2$ using the fluid collection assembly 18. As discussed above related to FIGS. 1 and 2, the collected wash fluids may be directed to a cleaning system 22 where the wash fluids are treated.

In operation, a vehicle may be driven onto the top surface 32 of wash pad 12 using ramps 26, or equipment may be positioned in some way on top surface 32. An operator may spray wash fluid onto the vehicle or equipment, which may detach debris from the vehicle or equipment. The wash fluid and debris collects on the top surface 32 and move along the top surface 32 to the collecting trough 14 along a peripheral edge of wash pad 12. Large debris may be blocked from moving into collecting trough 14 using the containment wall 20 and/or portions of lids 56.

The debris positioned in collecting trough 14 settles along the bottom of trough insert 50. Motor 82 is operated to drive chain 60 of the conveyor assembly 16 to advance flights 62 along the bottom of trough insert 50 to move the debris to the chute 76. Conveyor assembly 16 directs the debris to the open end 78 of chute 76 and into the debris container 28.

The wash fluids that collect in collecting trough 14 flow toward fluid collection assembly 18, which is a direction opposite the flow of debris out of collecting trough 14. Each of the flights 62 positioned along the bottom of trough insert 50 may act as a weir within the collecting trough 14. The wash fluid flows over the flights on its way to the discharge end of collecting trough 14 (e.g., where screen 92 is positioned). The flights 62 help clarify the liquid waste stream of wash fluid and reduce the solids load in the liquid waste stream. The reduced amount of solids in the liquid waste stream provides limited amounts of solids to which the discharge screen 92 is exposed, which may provide for flow through the screen 92 at a much higher flow rate. Further, as discussed above, the flights 62 may help scrape off screen 92 as the flights 62 rotate along their path P of travel, which may further increase flow rate through screen 92. The wash fluids that pass through or over screen 92 and out of first outlet opening 59A are directed by fluid collection assembly 18 to, for example, cleaning system 22 shown in FIG. 1.

Figure 15:
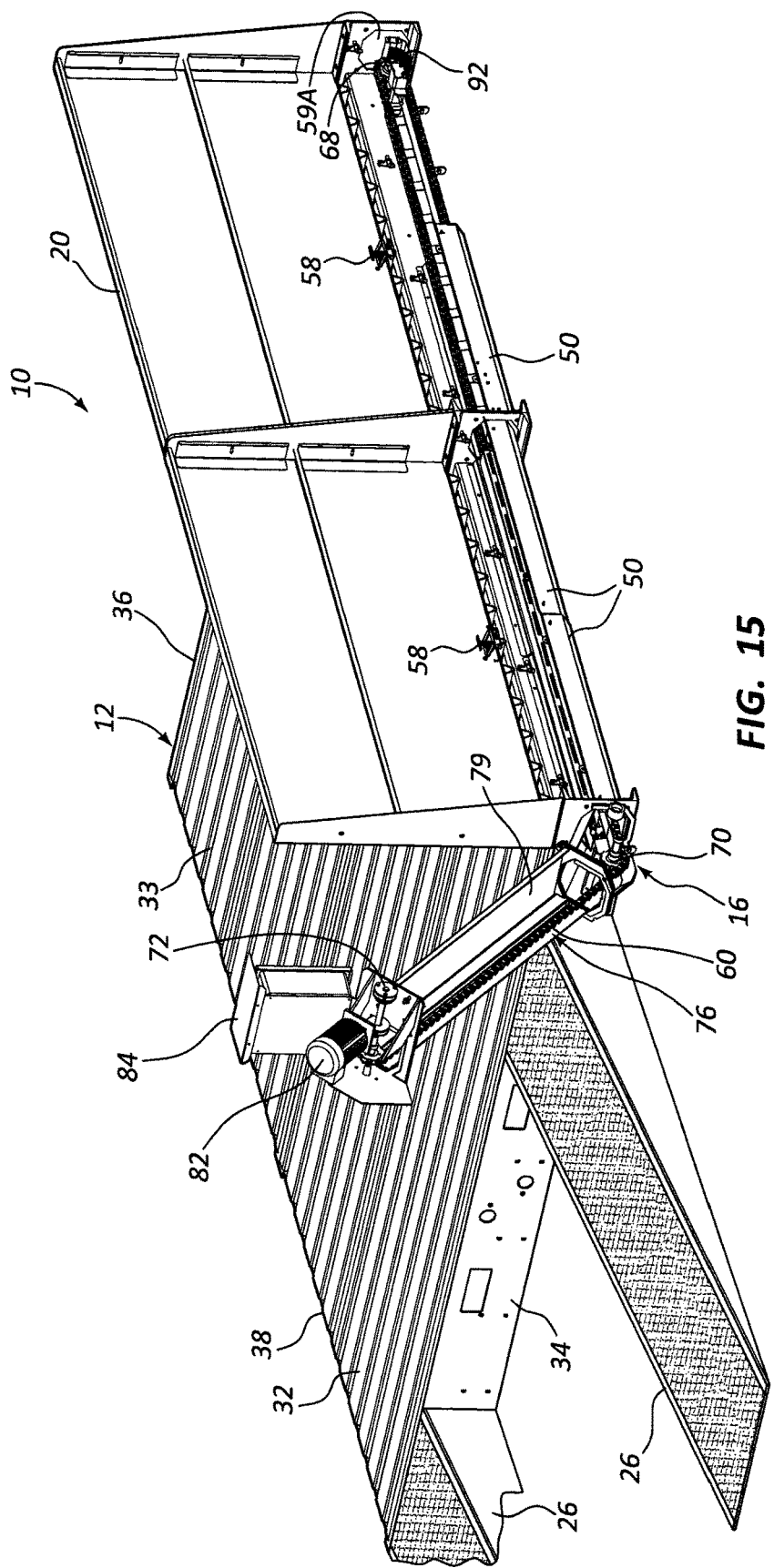
FIG. 15 is a perspective view of a portion of the wash fluid containment system shown in FIG. 14 with portions thereof removed.
Figure 16:
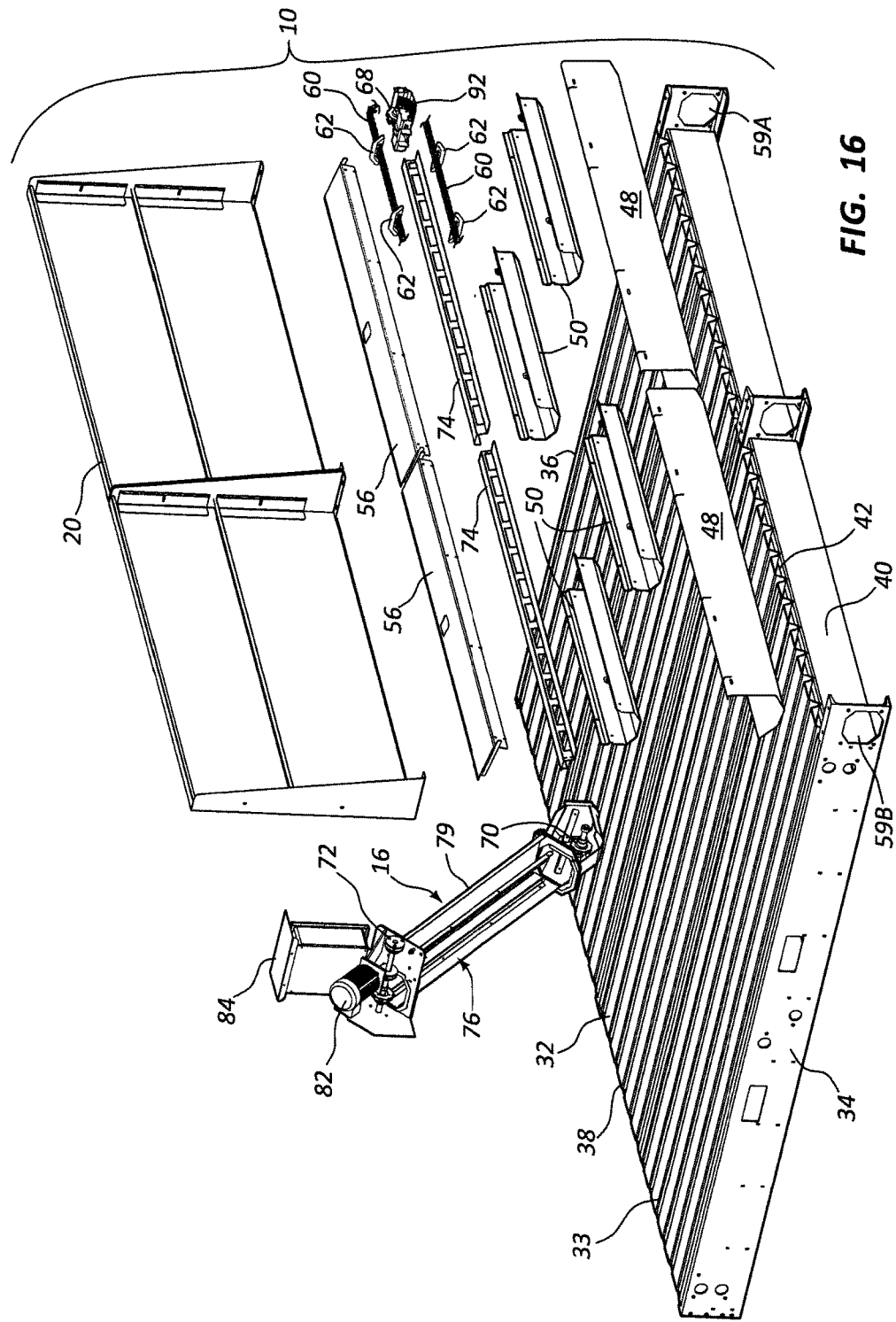
FIG. 16 is an exploded perspective view of portions of the wash fluid containment system shown in FIG. 14.

FIGS. 15 and 16 show the wash fluid containment system of FIG. 14 with portions thereof removed and/or exploded for easier viewing. For example, FIG. 15 shows the outer wall 48 of collecting trough 14 removed to show some of the trough inserts 50, portions of chain 60, and sprockets 68, 70, 72. Among other things, FIG. 16 shows a second outlet opening 59B in support base 30 of wash pad 12 that provides flow communication between chute 76 and collecting trough 14.

While the examples described above provide removal of the solids and debris in a direction opposite removal of the wash fluids from the collecting trough, other examples may provide removal of both the solids and liquids in the same direction. For example, the screen and associated fluid collection assembly 18 may be positioned at any point along the length of collecting trough 14 or along the chute 76 (e.g., at the elbow section 80). The screen 92 may be positioned along one of the side walls of collecting trough 14 or chute 76 and directed in a lateral direction rather than being positioned at one of the ends of collecting trough 14 and directed in an axial direction. Furthermore, it may be possible to have multiple outlets for the wash fluid, and a screen associated with any one of the outlets.

Another example method associated with the wash fluid containment system relates to a method of handling wash fluid and debris. The method may include providing a wash pad, a collecting trough, a conveyor, and a fluid collector. The method may include washing debris from an object positioned on the wash pad, collecting wash fluid and the debris in a collecting trough, and removing the debris from the trough with the conveyor. The method may also include passing wash fluid through a screen and into the fluid collector. The conveyor may remove debris from the screen as the conveyor removes the debris from the trough. The wash fluid may be removed from the trough in a direction that is opposite from the direction in which the debris is removed from the trough. The conveyor may include at least one chain and a plurality of flights mounted to each of the chains, wherein removing the debris includes moving a plurality of flights along a bottom surface of the trough. The plurality of flights may scrape debris from the screen as the conveyor moves past the screen. In some arrangements, the screen is removed from the system and the liquid waste stream is clarified as it moves over the flights, which act as weirs to help reduce the solids load in the liquid waste stream.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A wash fluid and debris containment system, comprising:
    a wash pad, comprising:
        a support base having a first side and a second side, the second side being positioned opposite the first side;
        a top surface that rests on the support base and configured to direct flow of wash fluid and debris to an edge of the top surface;
    a collecting trough extending along the edge of the top surface, the collecting trough configured to receive the wash fluid and debris from the top surface, the collecting trough having a first end positioned at the first side of the support base, the collecting trough having a second end positioned at the second side of the support base;
    a wash fluid containment system positioned at the second end of the collecting trough and at the second side of the support base;
    a debris container positioned at the first end of the collecting trough and at the first side of the support base;
    a conveyor positioned in at least a portion of the collecting trough and operable to remove the debris from the second end to the first end of the collecting trough, the conveyor having flights with space along a top surface of each flight that allows fluid to flow over the top of the flights inside the collecting trough, wherein the wash fluid containment system is positioned behind and underneath the conveyor at the second end, and wherein the fluid containment system includes a screen positioned between the conveyor and a fluid outlet of the collection trough, wherein there is a fluid path over the top of the screen such that fluids in the collecting trough may move over the top of the screen in the event that the screen is clogged.

2. The wash fluid and debris containment system of claim 1 further comprising a lockable lid arranged to cover the collecting trough.

3. The wash fluid and debris containment system of claim 1 further comprising a separator positioned between the top surface and the collecting trough, the separator preventing debris above a threshold size from entering into the collecting trough.

4. The wash fluid and debris containment system of claim 1 wherein the collecting trough extends along a side of the wash pad, and wherein a portion of the conveyor has a shape that substantially matches the profile of a bottom portion of the collecting trough.

5. The wash fluid and debris containment system of claim 1, further comprising a trough insert with trough guides that is separable from the collecting trough and disposed thereinside.

6. A wash fluid and debris containment system, comprising:
   a wash pad having a first side and a second side, the second side being positioned on the wash pad opposite the first side;
   a collecting trough configured to receive wash fluid and debris collected on the wash pad, the collecting trough having a first end positioned at the first side of the wash pad, the collecting through having a second end positioned at the second side of the wash pad:
   a conveyor including at least one chain and a plurality of flights connected to the at least one chain, the plurality of flights being movable by the at least one chain to remove the debris from the collecting trough by moving the debris from the second end to the first end;
   a fluid collector in flow communication with the collecting trough at the second end;
   a screen interposed between the collecting trough and the fluid collector, with a space above the screen to allows fluid to flow over the screen and bypass the screen into the fluid collector if the screen is clogged;
   wherein the plurality of flights are configured to remove debris from the screen as the conveyor moves past the screen.

7. The wash fluid and debris containment system of claim 6 wherein the wash fluid flows over the screen and out of the collecting trough when the screen is clogged with debris.

8. The wash fluid and debris containment system of claim 6, further comprising:
   a wall positioned along an edge of the washpad removably disposed between the collecting trough and a top surface of the washpad; and
   a lid arranged relative to the top surface of the washpad to assist in blocking large debris from moving into the collecting trough and arranged at an angle relative to a horizontal plane and including a lip along an edge thereof positioned adjacent to the edge of the washpad to block large sized debris and such that when the wall is in place a free edge of the lid rests against a vertical portion of the wall and when the wall is removed the free edge of the lid rests against a top surface of the wash pad along the edge of the washpad.

9. The wash fluid and debris containment system of claim 6 wherein the plurality of flights extend downward from the at least one chain when positioned to move the debris out of the collecting trough.

10. The wash fluid and debris containment system of claim 6 wherein the collecting trough includes a replaceable gutter insert having a profile that matches a profile of the plurality of flights.

11. The wash fluid and debris containment system of claim 6 wherein the wash fluid flows over the plurality of flights when moving toward the screen the plurality of flights providing a weir function in the collecting trough.

12. The wash fluid and debris container system of claim 6, further comprising a shield positioned in the collecting trough and extending over the at least one chain to protect the at least one chain from contact by the debris.

13. A wash fluid and debris conveyor system, comprising:
   a wash pad having a first side and a second side, the second side being positioned on the wash pad opposite the first side;
   a collecting trough having a first end and a second end, the first end being positioned at the first side, the second end being positioned at the second side;
   a debris conveyor movable along at least a portion of the collecting trough to remove debris from the collecting trough at the first end and in a first direction;
   fluid collector in flow communication with the collecting trough, wherein wash fluid in the collecting trough flows into the fluid collector at the second end and in a second direction that is opposite the first direction, wherein the fluid collector includes a screen that blocks debris from flowing from the collecting trough into the fluid collector and there is a fluid path above the screen that allows for fluid to flow over and bypass the screen if the screen is clogged.

14. The wash fluid and debris conveyor system of claim 13 wherein the debris conveyor scrapes debris from the screen as the debris conveyor moves past the fluid collector.

15. The wash fluid and debris conveyor system of claim 13 further comprising at least one of a liquid jet and a compressed air stream configured to clean off the screen.

* * * * *